United States Patent
Dateki

(10) Patent No.: US 8,520,749 B2
(45) Date of Patent: Aug. 27, 2013

(54) INTERFERENCE NOISE ESTIMATION METHOD, RECEPTION PROCESSING METHOD, INTERFERENCE NOISE ESTIMATION APPARATUS, AND RECEIVER, IN MULTICARRIER COMMUNICATIONS SYSTEM

(75) Inventor: Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1215 days.

(21) Appl. No.: 12/358,417

(22) Filed: Jan. 23, 2009

(65) Prior Publication Data
US 2009/0141841 A1 Jun. 4, 2009

Related U.S. Application Data

(63) Continuation of application No. PCT/JP2007/057110, filed on Mar. 30, 2007.

(30) Foreign Application Priority Data

Jul. 25, 2006 (JP) ................................. 2006-202074

(51) Int. Cl.
H04K 1/10 (2006.01)
(52) U.S. Cl.
USPC ....................................................... 375/260
(58) Field of Classification Search
USPC ................. 375/260, 262, 265, 267; 370/208, 370/210
See application file for complete search history.

(56) References Cited

U.S. PATENT DOCUMENTS

| | | | |
|---|---|---|---|
| 5,521,937 A | 5/1996 | Kondo et al. | |
| 7,424,072 B2 | 9/2008 | Hayashi et al. | |
| 2004/0208138 A1 | 10/2004 | Hayashi et al. | |
| 2005/0207334 A1* | 9/2005 | Hadad | 370/203 |
| 2006/0154608 A1 | 7/2006 | Fukuoka et al. | |
| 2006/0203932 A1* | 9/2006 | Palanki et al. | 375/295 |
| 2006/0268676 A1* | 11/2006 | Gore et al. | 370/210 |
| 2007/0036179 A1* | 2/2007 | Palanki et al. | 370/491 |
| 2008/0260052 A1* | 10/2008 | Hayashi | 375/260 |
| 2009/0010313 A1* | 1/2009 | Hasegawa | 375/148 |

FOREIGN PATENT DOCUMENTS

| | | |
|---|---|---|
| JP | 7-202758 | 8/1995 |
| JP | 11252040 | 9/1999 |
| JP | 2003348046 | 12/2003 |
| WO | 03/088538 | 10/2003 |
| WO | 2004/073223 | 8/2004 |

OTHER PUBLICATIONS

International Search Report for the corresponding International Application No. PCT/JP2007/057110; date of completion Jun. 12, 2007.

(Continued)

*Primary Examiner* — Young T. Tse
(74) *Attorney, Agent, or Firm* — Myers Wolin, LLC

(57) ABSTRACT

To make it possible to estimate interference noise power with high accuracy even when channel variations are present in a frequency domain and a time domain, in a multicarrier communications system in which pilot signals allocated at different subcarrier frequencies in a predetermined transmission frequency band are transmitted, average values between pilot signals received at different symbol timing periods and at different subcarrier frequencies are obtained, and interference noise is estimated based on a difference between the average values.

15 Claims, 16 Drawing Sheets

(56) References Cited

OTHER PUBLICATIONS

3GPP TR 25.814 V1.5.0 (May 2006) Technical Report 3rd Generation Partnership Project; Technical Specification Group Radio Access Network; Physical Layer Aspects for Evolved UTRA (Release 7). May 2006.

Hiroyuki Kawai et al.; "Independent Adaptive Control of Surviving Symbol Replica Candidates at Each Stage Based on Minimum Branch Metric in QRM-MLD for OFCDM MIMO Multiplexing"; IEEE 2004; p. 1558-1564.

Michael Speth et al.; "Broadband Transmission Using OFDM: System Performance and Receiver Complexity"; IEEE 1998; pp. 99-104.

* cited by examiner

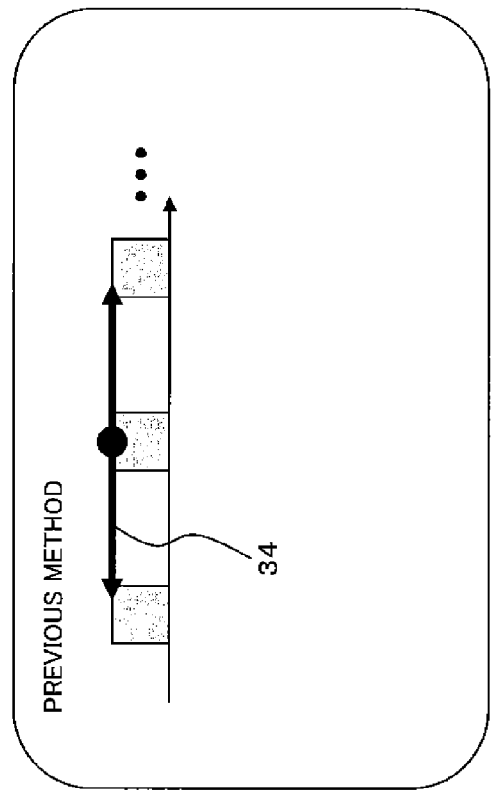
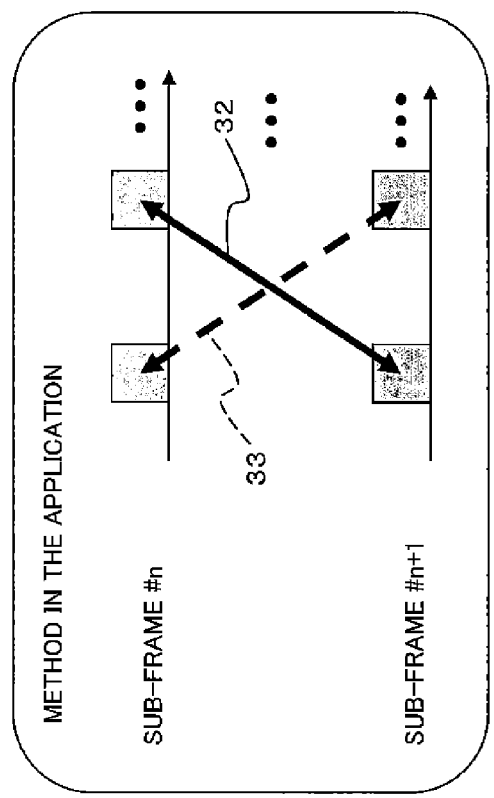

INTERFERENCE NOISE ESTIMATION METHOD, RECEPTION PROCESSING METHOD, INTERFERENCE NOISE ESTIMATION APPARATUS, AND RECEIVER, IN MULTICARRIER COMMUNICATIONS SYSTEM

CROSS REFERENCE TO RELATED APPLICATION(S)

This application is based upon and claims priority to PCT Application PCT/JP2007/057110 filed on Mar. 30, 2007, the entire contents of which are incorporated herein by reference.

FIELD

The present invention relates to an interference noise estimation method, a reception processing method, an interference noise estimation apparatus, and a receiver, for use in a multicarrier communications system. For example, the present invention relates to the technology suitable for use in the interference noise estimation on the receiver end at the time of OFDM (Orthogonal Frequency Division Multiplexing) communications.

BACKGROUND (1) OFDM System and Transmission Format (Pilot Signal)

OFDM has been applied to a variety of types of communications systems. As an example of OFDM, the following non-patent document 1 examines a cellar system employing OFDM. The system of this non-patent document 1 describes that a pilot signal [called "reference symbol" (RS) in the non-patent document 1] having been already known in transceiving used in channel estimation or the like is sent at the two-dimensional allocation of the time and the frequency as illustrated in, for example, FIG. 11 (see section 7.1.1.2.2 in non-patent document 1).

That is, according to the example illustrated in FIG. 11, in a single sub-frame (=0.5 ms=7 symbol time periods), the first pilot signals (1st reference symbols) $R_1$ are allocated (mapped) to the leading symbol of the sub-frame at a seven sub-carrier cycle, and the second pilot signals (2nd reference symbol) $R_2$ are allocated to the fifth symbol of the sub-frame at a seven sub-carrier cycle (here, allocated to sub-carriers different from the first pilot signal $R_1$). In this instance, a variety of types of data (D) are allocated to the other symbols.

(2) Estimation of Interference Noise Power

A formula for estimating interference noise power is indicated as the formula (13) in the following non-patent document 2 (see p. 1560). This method uses a channel estimation value at the position of each pilot signal in the frequency domain at the same symbol time (the same reception time). The channel estimation value A at a certain position and the average value B of the channel estimation values of the neighboring pilot signals in the frequency direction are calculated, and interference noise power is estimated based on the average power of a difference there between (A-B).

(3) Use of Interference Noise Estimation Value

Here, the interference noise estimation value is used on a receiver for various purposes.

For example, the following non-patent document 2 describes an example of reception processing by use of the interference noise estimation value. The interference noise estimation value is used for a part of MIMO demodulation processing.

Further, paragraph [0058] in the following patent document 1 describes that a fading coefficient/noise power is publicly known as the maximum ratio combination coefficient of more than one branch, and also describes that the noise power estimation value is used in reception processing.

In this manner, since the interference noise power is used in a variety of types of communications systems and receivers, to estimate interference noise power with high accuracy is significantly important. If correct estimation is unavailable, it leads to deterioration of the reception (demodulation processing) ability of a receiver.

Patent Document 1: Japanese Patent Application Publication (Laid-open) No. HEI 7-202758

Non-patent Document 1: 3GPP TR25.814 V1.5.0 (2006.5)

Non-patent Document 2: H. Kawai, et al., "Independent Adaptive Control of Surviving Symbol Replica Candidates at Each Stage Based on Minimum Branch Metric in QRM-MLD for OFCDM MIMO multiplexing", IEEE VTC2004-Fall. Vol. 3, pp 1558-1564

SUMMARY

According to the technique described in the above non-patent document 2, in a case where delay dispersion is small, it is possible to estimate interference noise power with high accuracy. However, with the delay dispersion enlarged, it becomes impossible to calculate the correct estimation value in a domain with a high SNR (Signal to Noise Ratio) (saturated) due to the fact that a part of channel variations in the frequency domain due to frequency-selective fading is calculated.

Further, it is considerable that calculation is performed with application of the technique described in non-patent document 2 to the time domain. That is, calculation is performed for obtaining the channel estimation value of a reference pilot signal at a certain time and the average value of the neighboring pilot signals of the reference pilot signal in the time direction, and the interference noise power is estimated by means of obtaining the average power of a difference between the above two. However, in a case where channel variations are present in the time domain due to the time selective fading, there exists similar problem.

Accordingly, in a case where accurate estimation of interference noise power is required in a significantly high SNR domain, such as when communications is performed in a high transmission speed, there is a problem of deterioration of the reception ability.

In order to accomplish the above object, the present invention features in that it employs the following interference noise estimation method, reception processing method, interference noise estimation apparatus, and receiver, in the following multicarrier communications system.

(1) As a generic feature, there provided is an interference noise estimation method for estimating interference noise for use in a multicarrier communications system in which pilot signals allocated at different frequencies in a predetermined transmission frequency band are transmitted, the method comprising: a pilot averaging procedure for obtaining an average value between pilot signals received at different timing and at different frequencies; and an interference noise estimation procedure for estimating interference noise based on a difference of the average values obtained in the pilot averaging procedure.

(2) As a preferred feature, in the pilot averaging procedure, calculating an average value of the pilot signals allocated at the both ends of the two diagonal lines of a quadrangle formed by four positions at which four pilot signals are allocated, respectively, in a two-dimensional domain of a time domain and a frequency domain.

(3) As another generic feature, there provided is a reception processing method for use in a multicarrier communications system in which pilot signals allocated at different frequencies in a predetermined transmission frequency band are transmitted, the method comprising: a pilot averaging procedure for obtaining an average value between pilot signals received at different timing and at the different frequencies; an interference noise estimation procedure for estimating interference noise based on a difference of the average values obtained in the pilot averaging procedure; and a demodulation processing procedure for performing multicarrier demodulation processing based on an estimation result obtained in the interference noise estimation procedure.

(4) As a still another generic feature, there provided is an interference noise estimation apparatus for use in a multicarrier communications system in which pilot signals allocated at different frequencies in a predetermined transmission frequency band are transmitted, the apparatus comprising: pilot averaging means operable to obtain an average value of pilot signals received at different timing and at different frequencies; and interference noise estimation means operable to estimate interference noise based on a difference of the average values obtained by the pilot averaging means.

(5) As a yet another generic feature, there provided is a receiver for use in a multicarrier communications system in which pilot signals allocated at different frequencies in a predetermined transmission frequency band are transmitted, the receiver comprising: an interference noise estimation apparatus including: a pilot averaging means operable to obtain an average value of pilot signals received at the different timing and at the same frequency and an average value of pilot signals received at the different timing and at different frequencies; and an interference noise estimation means operable to estimate interference noise based on a difference of the average values obtained by the pilot averaging means; and a demodulation processing means operable to perform multicarrier demodulation processing based on an estimation result obtained by the interference noise estimation apparatus.

Additional objects and advantages of the invention will be set forth in part in the description which follows, and in part will be obvious from the description, or may be learned by practice of the embodiment. The object and advantages of the embodiment will be realized and attained by means of the elements and combinations particularly pointed out in the appended claims.

It is to be understood that both the foregoing general description and the following detailed description are exemplary and explanatory only and are not restrictive of the embodiment, as claimed.

BRIEF DESCRIPTION OF THE DRAWINGS

FIG. 7(A) is a conceptual diagram indicating pilot signal positions which are subjects of calculation in the interference noise estimation method according to the present embodiment; FIG. 7(B) is a conceptual diagram indicating pilot signal positions which are subjects of calculation in the previous method;

DESCRIPTION OF REFERENCE CHARACTERS

| | |
|---|---|
| 11 | sub-carrier mapping unit |
| 12 | IFFT |
| 13 | DA converter |
| 14 | up-conversion unit |
| 15 | transmitter antenna |
| 21 | receiver antenna |
| 22 | down-conversion unit |
| 23 | AD converter |
| 24 | FFT |
| 25 | channel estimation unit (pilot extraction unit) |
| 26 | interference noise power estimation unit |
| 261 (261a, 261b) | pilot averaging means (procedure) |
| 262 | interference noise estimation means (procedure) |
| 263 | difference detection means (procedure) |
| 264 | square magnitude calculation means (procedure) |
| 265 | averaging means (procedure) |
| 27 | demodulation processing unit |
| 28 | estimation control unit (evaluation means, control means) |

DESCRIPTION OF EMBODIMENT(S)

An embodiment of the present invention will now be described with reference to the relevant accompanying drawings. However, the present invention should by no means be limited to the embodiments described below, and various changes or modifications may be suggested without departing from the gist of the invention.

[A] One Embodiment

(A1) OFDM Format

The present embodiment is predicated upon a system employing the OFDM scheme.

Figure 1:
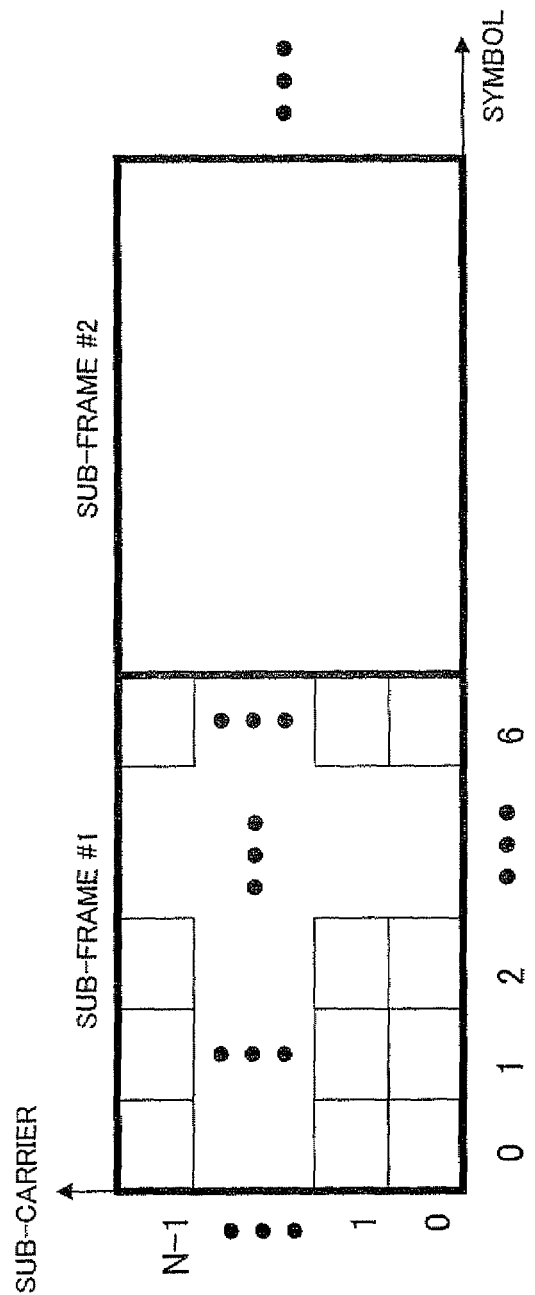
FIG. 1 is a diagram illustrating an example of a configuration of an OFDM transmission frame format according to a first embodiment.

That is, as illustrated in FIG. 1, for example, an OFDM transmitter is on the predication that N-number (N is an integer not smaller than 2, and for example, N=512) of input signals with N-number of sub-carriers (frequencies) per symbol time period. That is, frequency resources of N-number of sub-carrier×time are present. Further, it is possible to allocate (map) different transmission data items to different squares (symbols), respectively, in the frequency×time resources depicted in FIG. 1. In this instance, in the present example, in obedience to the description of the above non-patent document 1, a signal sub-frame is made by seven symbol time periods (0.5 ms)×N-number of sub-carriers.

Figure 2:
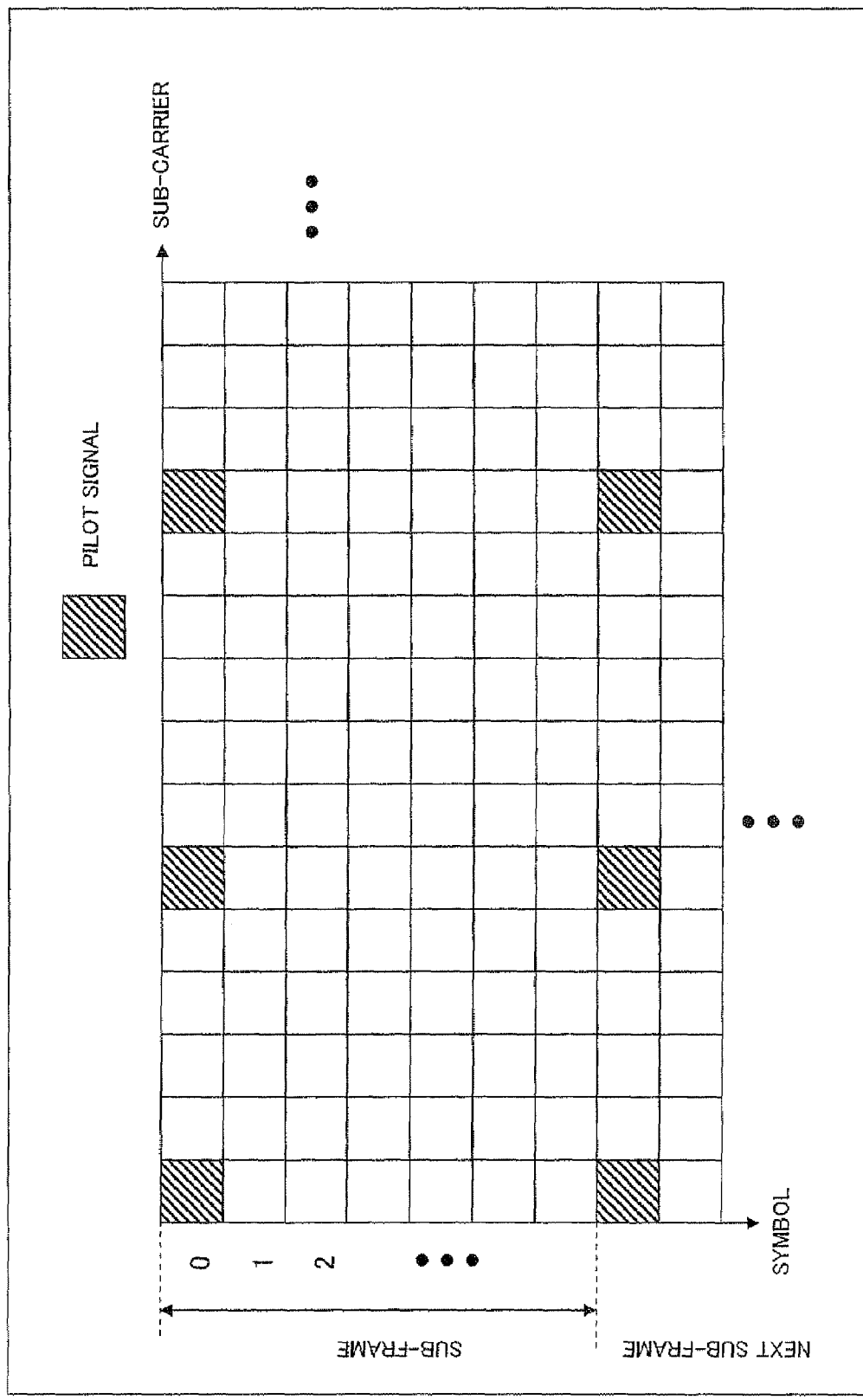
FIG. 2 is a diagram illustrating an example of allocation of pilot signals in the frame format depicted in FIG. 1.

Further, the allocation illustrated in FIG. 2 is used as an example of an allocation of pilot signals. That is, pilot signals are allocated with the leading symbols of the sub-frame at M (=6) sub-carrier intervals (cycles). It is assumed that a pilot signal is any kind of already known signal pattern in transceiving, and that the transmission pilot signal pattern allocated at the positions of the sub-frame #n (n=0 through N−1) and the sub-carrier #k (k=0 through N−1) is expressed as x(n, k). Still further, the sub-carrier (frequency) to which pilot signals are allocated (mapped) is called a pilot channel value, and its channel estimation value is sometimes called a pilot channel value or a channel value, simply.

In addition, as illustrated in FIG. 2, it is assumed that the above mentioned pilot signals are repeatedly allocated to the same sub-carrier at a sub-frame cycle and sent from the OFDM transmitter. In this instance, herein after, it is assumed that all the pilot signals are sent as 1+0j for the simplification of description.

(A2) OFDM Transmitter

Figure 3:
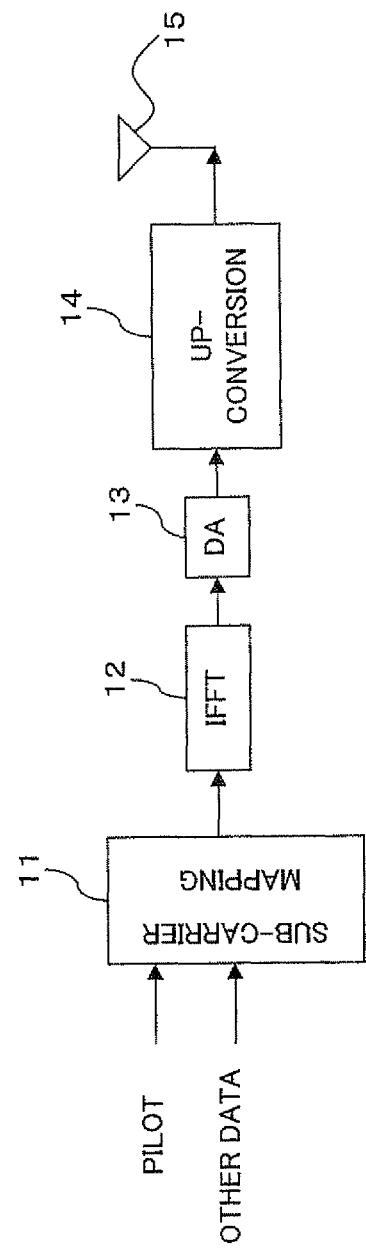
FIG. 3 is a block diagram illustrating an example of a configuration of a part of an OFDM transmitter according to the present embodiment.

With the above described sub-frame configuration, FIG. 3 illustrates an example of a configuration of an OFDM transmitter which maps each signal to each sub-carrier in each symbol for transmission thereof. As illustrated in FIG. 3, with an attention paid to its part, the OFDM transmitter (herein after, will be simply called the "transmitter") includes, for example: a sub-carrier mapping unit 11; an IFFT (Inverse Fast Fourier Transformer) 12; a DA (Digital-to-Analog) converter 13; an up-conversion unit 14; and a transmitter antenna 15.

Here, upon receiving a pilot signal and other data as input signals, the sub-carrier mapping unit 11 maps N-number of input signals to N-number of sub-carriers for each symbol time period in such a manner that the two-dimensional symbol allocation of time period×frequency, already described with reference to FIG. 1 and FIG. 2, are realized.

The IFFT 12 performs IFFT processing to a frequency domain signal subjected to sub-carrier mapping by the sub-carrier mapping unit 11, thereby converting the frequency-domain signal into a time-domain signal; the DA converter 13 converts the time-domain signal into an analogue signal; the up-conversion unit 14 performs frequency-conversion (up-conversion) of the analogue signal from the DA converter 13 into a signal at a transmission radio frequency (RF); the transmitter antenna 15 radiates the transmission RF signal to space toward the receiver.

With this arrangement, in the transmitter of the present example, the sub-carrier mapping unit 11 maps the pilot signal and other data signals, which are to be sent, to N-number of sub-carriers per symbol time period in such a manner that the two-dimensional symbol allocation depicted in FIG. 1 and FIG. 2 is realized. The pilot signal and other data signals are subjected to IFFT processing by the IFFT 12, thereby being converted into a time-domain signal, and then converted into an analogue signal by the DA converter 13. Then, the up-conversion unit 14 up-converts the analogue signal into a transmission RF signal and then sends the transmission RF signal to the receiver through the transmitter antenna 15.

(A3) OFDM Receiver

Figure 4:
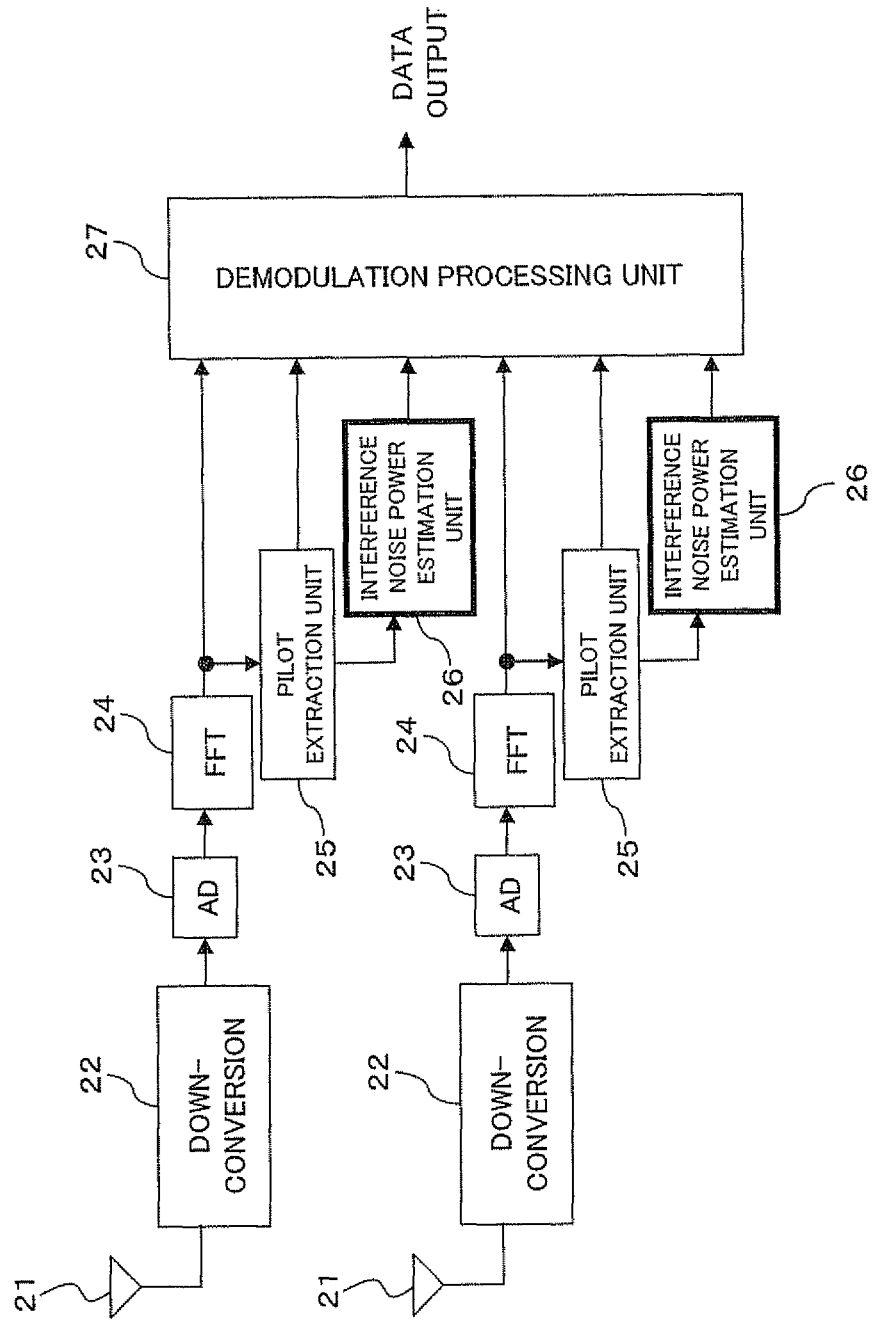
FIG. 4 is a block diagram illustrating an example of a configuration of a part of an OFDM receiver according to the present embodiment.

Next, FIG. 4 illustrates an example of a configuration of an OFDM receiver which receives RF signals sent from the above described transmitter. As shown in FIG. 4, with an attention paid to its part, the OFDM receiver according to the present embodiment (herein after, will be simply called "receiver") includes, for example: a receiver antenna 21; a down-conversion unit 22; an AD (Analog to Digital) converter 23; an FFT 24; a pilot extraction unit 25; an interference noise power estimation unit 26; and a demodulation processing unit 27. Here, in this FIG. 4, a reception diversity (or MIMO reception) configuration having more than one (two) system is provided each having the receiver antenna 21; a down-conversion unit 22; an AD converter 23; an FFT 24; a pilot extraction unit 25; and an interference noise power estimation unit 26.

Here, the receiver antenna 21 receives an RF signal sent from the transmitter; the down-conversion unit 22 performs frequency-conversion (down-conversion) of the RF signal received through the receiver antenna 21 down to a baseband frequency; and the AD converter 23 converts the baseband signal received by the down-conversion unit 22 into a digital signal.

The FFT 24 performs FFT processing to the digital signal from the AD converter 23 at each symbol timing by the unit of N samples, thereby converting the time-domain signal into a frequency-domain signal for extracting N-number of sub-carrier signals. The channel estimation unit (pilot extraction unit) 25 performs correlation calculation between, for example, the received pilot signals and the replicas of the pilot signals, thereby extracting the pilot signals allocated in the frequency×time domain to estimate propagation path distortion (that is, obtaining the channel estimation value), as already described, and cancels the pilot pattern used by the transmitter.

The interference noise power estimation unit 26 estimates interference noise (power) based on the pilot signals extracted by the pilot extraction unit 25. In the present example, as described later with reference to FIG. 6 and FIG. 7(A), with an attention paid to the two diagonal lines of a quadrangle formed by four positions of a total of four pilot signals, two pilots adjacent to each other on the frequency axis and two pilots adjacent to each other on the time axis, the interference noise power estimation unit 26 calculates each of the average values of the channel estimation values of the pilot signals positioned at the both ends of each of the diagonal lines, thereby estimating interference noise power based on a difference between the two power average values of the channel estimation values corresponding to the two diagonal lines.

The demodulation processing unit 27 uses the interference noise estimation value obtained by the pilot signal extracted by the pilot extraction unit 25 and the interference noise power obtained by the interference noise power estimation unit 26 to perform demodulation processing such as synchronous detection and combining or the like of the received signals executed by more than one receiver antenna 21.

Hereinbelow, a description will be given of an operation of the receiver of the present example having the above described configuration. The RF signal received by the receiver antenna 21 is subjected to down-conversion to the baseband frequency performed by the down-conversion unit 22, and then subjected to AD conversion into a digital signal performed by the AD converter 23. Subsequently, this signal after being subjected to the AD conversion is then subjected to FFT processing executed by the FFT 24 by the unit of N-number of samples. As a result, the time domain signal is converted into a frequency domain signal, N-number of sub-carrier signals being thereby extracted, and the extracted sub-carrier signals are input to the demodulation processing unit 27 and the pilot extraction unit 25.

The pilot extraction unit 25 extracts the pilot signals allocated in the frequency×time domain from the reception signal after being subjected to the FFT processing, and cancels the pilot pattern used at the time of transmission.

For example, in a case where the transmission pilot signal pattern allocated at the positions of sub-frame #n and sub-carrier #k is expressed as x(n, k), the reception signal r(a, n, k) with the sub-carrier #k corresponding to the symbols coped with the reception antenna #a can be expressed by the following formula (1):

$$r(a,n,k) = H(a,n,k)x(n,k) + z(a,n,k) \quad (1)$$

where, in this formula (1), H is a complex number which expresses changes in amplitude and phase due to the propagation path; z indicates interference noise added in the propagation path.

The pilot extraction unit 25 then makes the signal to be output to the interference noise power estimation unit 26 and the demodulation processing unit 27 a signal which is subjected to pattern cancel expressed by the following formula (2):

$$h(a,n,k) = r(a,n,k)/x(a,n,k) \quad (2)$$

The demodulation processing unit 27 performs demodulation processing such as synchronous detection and combination of reception signals at more than one receiver antenna 21 by use of the estimation values of the interference noise power obtained from the pilot signal extracted by the pilot extraction unit 25 and of the interference noise power obtained by the interference noise power estimation unit 26. For example, the modulation processing is capable of being performed in the following manner.

That is, in a case where the signal sent on the sub-carrier #k is expressed as d(a, n, l, k) in the reception antenna #a, the sub-frame #n, and the symbol number #l of the sub-frame, the reception signal is expressed by the following formula (3), so that the diversity combination of the reception signals of the two receiver antennas 21 is capable of being processed as the following formula (4) by use of the estimation value $\sigma_{est}^2(a,n)$ input from the interference noise power estimation 26:

$$r(a, n, l, k) = H(a, n, l, k)d(a, n, l, k) + z(a, n, l, k) \quad (3)$$

$$R(n, l, k) = \sum_{a=1}^{2} \frac{h^*(a, n, M \times [k/M])r(a, n, l, k)}{\sigma_{est}^2(a, n)} \quad (4)$$

Here, in the formula (4), [k/M] expresses the result of rounding-off of k/M.

Subsequently, a description will be made herein after of the estimation method performed by the interference noise power estimation unit 26, which is a part of the present example.

Here, first of all, for comparison with the previous technique, the method of estimation of interference noise power is described in a case where the estimation method described in the above non-patent document 2 is applied to the system according to the present example.

According to the estimation method in the non-patent document 2 (herein after, will be simply called the "previous method"), the estimation is executed by use of the pilot signal h(a, n, Mi) in the receiver antenna #a and the sub-frame #n. In a case where the estimation is implemented with k-number of times of averaging, the estimation method is capable of being expressed by the following formula (5):

$$\sigma_{est}^2(a, n) = \frac{2}{3} \frac{1}{K-2} \sum_{i=1}^{K-2} \left| h(a, n, Mi) - \frac{h(a, n, M(i+1)) + h(a, n, M(i-1))}{2} \right|^2 \quad (5)$$

Figure 5:
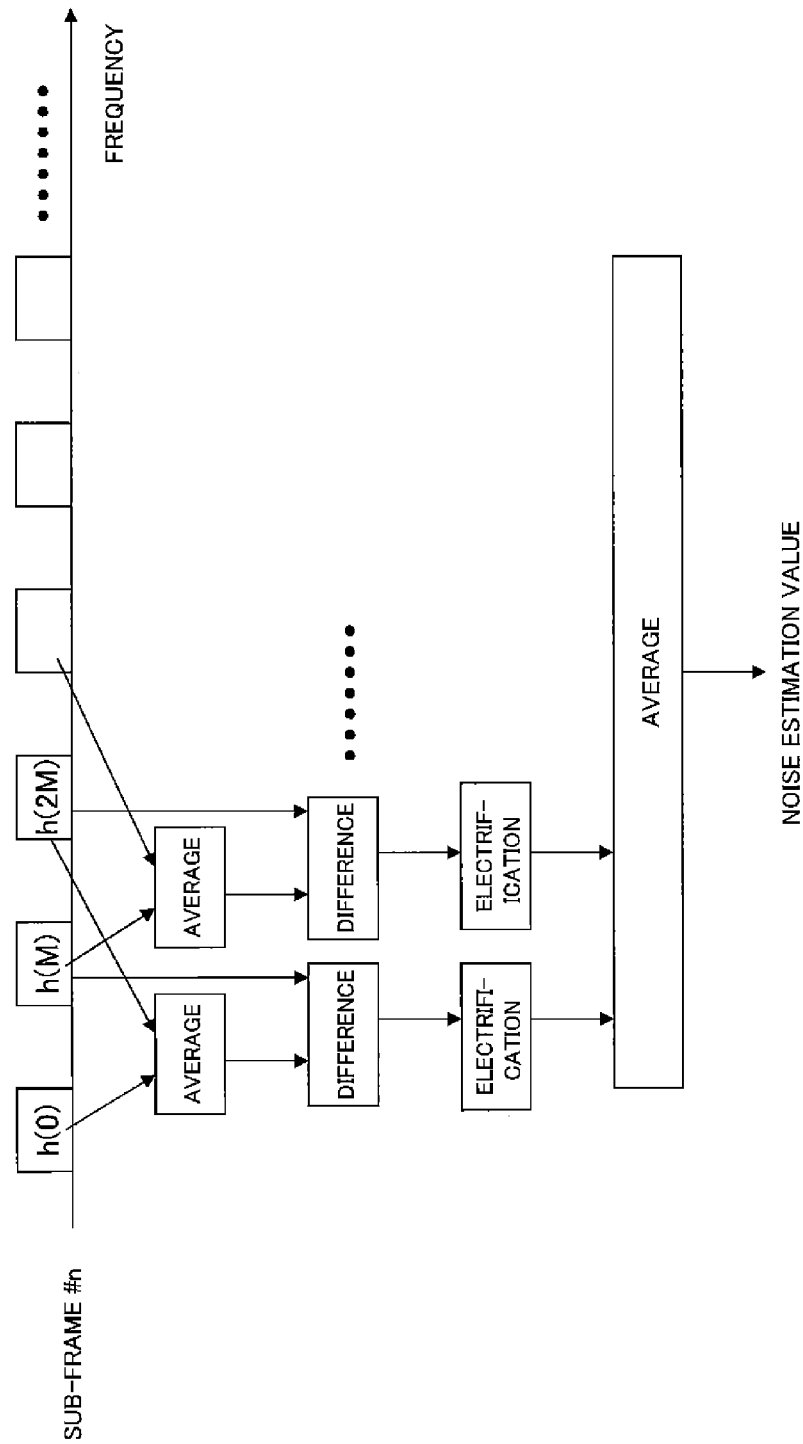
FIG. 5 is a conceptual diagram indicating the procedures of estimation (calculation) with a previous interference noise estimation method.

FIG. 5, for example, is a diagram illustrating this. That is, according to the previous method, a total of three pilot signals at the same symbol time, the pilot signal h(a, n, Mi) at the antenna #a and in the sub-frame #n as a reference (center), and the two pilot signals h(a, n, M(i−1)) and h(a, n, M(i+1)) adjacent to the reference pilot signal h(a, n, Mi) on the opposite side thereof. Here, FIG. 5 illustrates a case in which i=1, and the variable number expressions of the reception antenna number (a) and the sub-frame number (n) are omitted, and the reference pilot signal and the two pilot signals positioned adjacent to the reference pilot signal on the opposite sides thereof on the frequency axis are expressed as h(M), h(0), and h(2M), respectively.

In more detail, the average value between the two pilot signals h(M(i−1)) and h(M(i+1)) positioned adjacent to the reference pilot signal h(M) on the opposite sides thereof on the frequency axis is obtained, and square magnitude calculation of a difference between the thus obtained average value and the reference pilot signal h(M) is performed to all the pilot signals positioned at the same symbol time (for example, the leading symbol) in the same sub-frame #n, and the constant number of times of such a power average value is obtained as the estimation value of the interference noise power.

As schematically illustrated in FIG. 7(B), for example, this means that the interference noise power is estimated based on a difference between the average values of the channel values of the two pilot signals at the both ends indicated with the solid arrow 34 and the channel value of the reference pilot signal positioned at the center of the arrow 34.

In contrast to this, according to the method of estimation performed by the interference noise power estimation unit 26 in the present example, the estimation is executed by use of the pilot signals (four) at the receiver antenna #a and in the two sub-frames #n and #n+1 different in time. Such an estimation method is expressed by the following formula (6) in a case where the estimation is performed by k-number of times of averaging:

$$\sigma_{est}^2(a,n) = \frac{1}{K-1} \sum_{i=0}^{K-2} \left| \frac{h(a,n,Mi) + \frac{h(a,n+1,M(i+1))}{2}}{2} - \frac{h(a,n,M(i+1)) + \frac{h(a,n+1,Mi)}{2}}{2} \right|^2 \quad (6)$$

Figure 6:
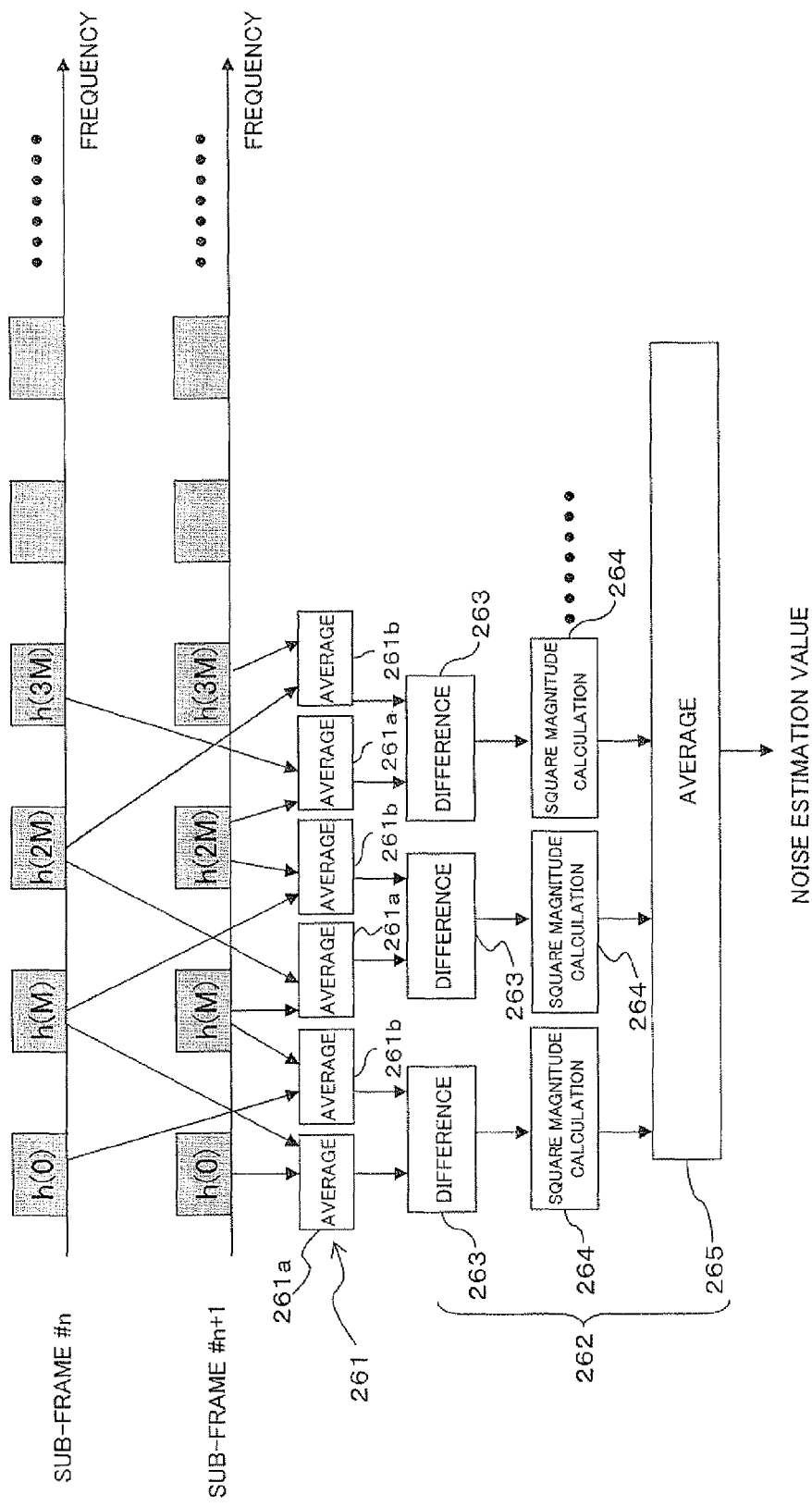
FIG. 6 is a conceptual diagram indicating the procedures of estimation (calculation) with the interference noise estimation method according to the present embodiment.

FIG. 6, for example, is a diagram illustrating this. That is, according to the estimation method of the present example, with respect to the same receiver antenna #a, (1) the average value between the pilot signal h(a, n, Mi) allocated on a certain sub-carrier #Mi in a certain sub-frame and the pilot signal h(a, n+1, M(i+1)) (the sub-carrier number is #M(i+1)) allocated adjacent to the pilot signal h(a, n, Mi) in the next sub-frame #n+1 in the frequency axis (high-frequency side) is obtained [the pilot averaging process: see reference character 261 (261a)];

(2) the average value between the pilot signal h(a, n, M(i+1)) (the sub-carrier number is #M(i+1)) allocated adjacent to the pilot signal h(a, n, Mi) in the sub-frame #n in the frequency axis direction (high-frequency side) and the pilot signal h(a, n+1, Mi) (the sub-carrier number is #Mi) allocated adjacent to the pilot signal h(a, n, M(i+1)) in the next sub-frame #n+1 in the frequency direction (low-frequency side) is obtained [the pilot averaging process: see reference character 261 (261b)]; and (3) a difference of these average values is detected by the difference detection means (procedure) 263, and square magnitude calculation of that is performed by the square magnitude calculation means (procedure) 264 to all the pilot signals allocated at the same symbol time (for example, the leading symbol), and such a power average value is obtained by the averaging means (procedure) 265 as the estimation value of interference noise power (interference noise power estimation procedure).

As schematically illustrated in, for example, FIG. 7(A), this means that interference noise power is estimated based on a difference between the average value of the channel values of the two pilot signals at the both ends of the solid arrow 32 and the average value of the channel estimation value of the two pilot signals at the both ends of the dotted arrow 33.

In other words, the interference noise power estimation unit 26 according to the present example includes: a pilot averaging means (procedure) 261 (261a, 261b) which obtains the average value between the pilot signals (pilot channel values) received at different time periods and at different sub-carriers (frequencies); and an interference noise estimation means (procedure) 262 estimating the interference noise based on a difference of average values obtained by the pilot averaging means 261 [a difference detection means (procedure) 263, an square magnitude calculation means (procedure) 264, and an averaging means (procedure) 265].

With an attention paid to the two diagonal lines of a quadrangle formed by the four positions of a total of four pilot signals, two pilot signals adjacent to each other on the frequency axis and two pilot signals adjacent to each other on the time axis, the pilot averaging means (procedure) 261 (261a, 261b) calculates each of the average values of the channel values of the pilot signals positioned at the both ends of each of the diagonal lines 32 and 33, thereby estimating interference noise power based on a power average of a difference between the two power average values corresponding to the two diagonal lines 32 and 33.

Hereinafter, a description will be made of the effects obtained by the estimation method according to the present embodiment in comparison with the previous method. As an example, in a case where time selective fading is absent and frequency selective fading is large (that is, in a case where the channel estimation values of the adjacent pilot signals in the frequency direction depicted in FIG. 2, for example, significantly varies).

Figure 8:
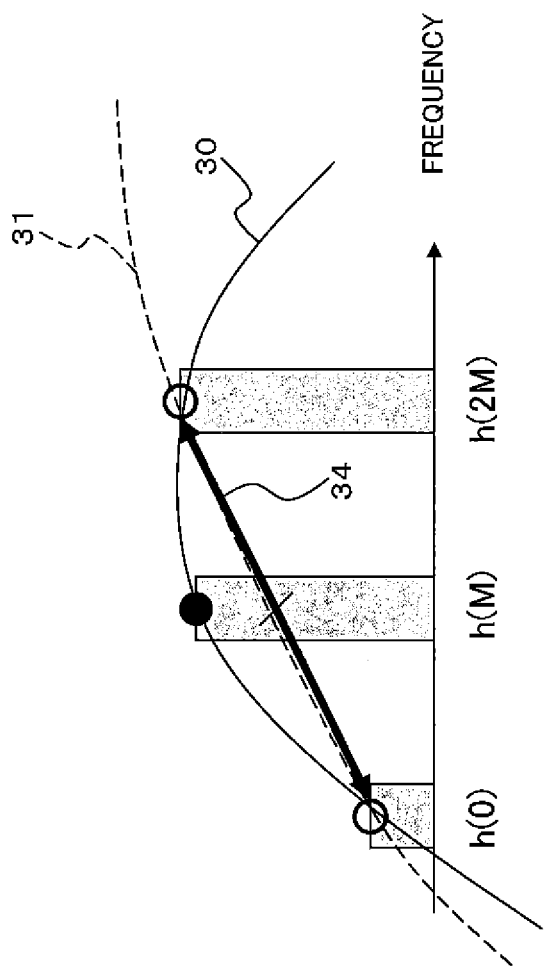
FIG. 8 is a conceptual diagram for describing estimation with the previous methods indicated in FIG. 5 and FIG. 7(B) in cases where significant channel variations are present in the frequency direction.

According to the previous method, as schematically illustrated in FIG. 8, in a case of circumstances in which delay dispersion is large, large frequency selective fading (see the solid line 30) is generated. Even if channel variations between the pilot signals (see mark "○") at the both of the two ends of the solid arrow 34 are found, and even if no interference noise is present as a result of obtaining a difference of the channel value at the center pilot signal position (see mark "●"), it results in that deviation is generated from the interference noise power value to be originally calculated.

That is, in the case of FIG. 8, when the frequency selective fading is small (see the dotted curved line 31), the average value of the pilot channel values adjacent to each other in the frequency direction indicated by the mark "○" is the same or approximately the same as the central pilot channel value indicated by the mark "●". Hence, it is possible to estimate correct interference. However, when the frequency selective fading is large, the average value between the pilot channel values adjacent to each other in the frequency direction indicated by the mark "○" is deviated from the central pilot channel value indicated by the mark "●", and thus interference noise power is falsely calculated with this deviation being included. In this manner, even in a case where interference noise is practically absent, a part of the channel variations in the frequency direction is falsely calculated as interference noise power. As a result, the interference noise power is estimated to be larger than that which should originally be, so that it becomes impossible to estimate correct interference noise power.

Figure 9:
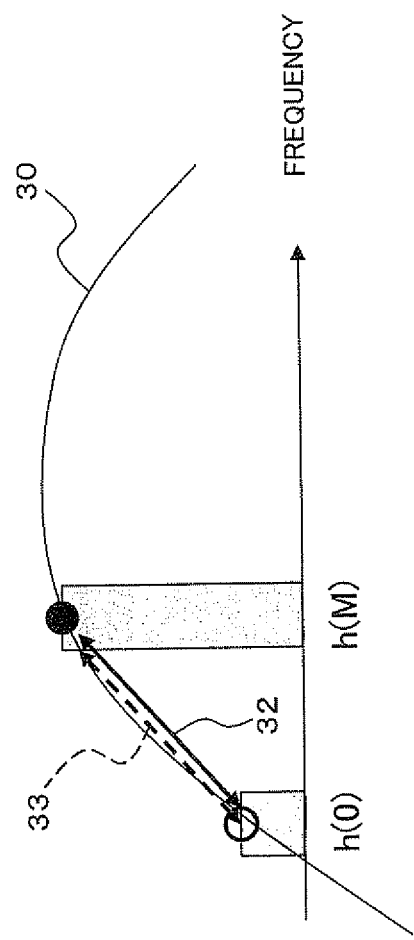
FIG. 9 is a conceptual diagram for describing estimation with the estimation methods according to the present embodiment indicated in FIG. 6 and FIG. 7(A) in cases where channel variations are the same as those of FIG. 8.

In contrast to this, FIG. 9 illustrates a concept of the estimation method according to the present embodiment in a case where similar channel variations in the frequency direction are present. As illustrated in FIG. 9, according to the estimation method of the present example, each of the average values of the two pairs of pilot channel values (see the marks "○" and "●") adjacent to each other in the frequency axis direction in the different sub-frames #n and #n+1 [that is, at different times T(n) and T(n+1)] is calculated (see the solid arrow 32 and the dotted arrow 33). Here, in FIG. 9, although the solid arrow 32 and the dotted arrow 33 are illustrated with deviation there between for the purpose of simplification of the illustration, they originally overlap one another.

This takes an example in which channel variations in the time direction are small, that is, in which variations of the pilot channel values at different two times T(n) and T(n+1) are small. Thus, no matter how large the channel variations in the frequency direction are, the average value (the center point of the solid arrow 32) calculated with the pilot channel values calculated at the both ends of the solid arrow 32 at a certain time T(n) agrees with the average value (the center point of the dotted arrow 33) calculated with the pilot channel values calculated at the both ends of the dotted arrow 33 at different time T (n+1). Accordingly, even under the propagation circumstances in which the frequency selective fading is large, it never occurs that the channel variations in the frequency direction are calculated as an interference noise power estimation value, so that it is possible to estimate the interference noise power with high accuracy.

In this instance, in contrast to the above, even under the circumstances such that the frequency selective fading is small and the time selective fading is large (that is, in a case where the channel value of the pilot signal in the time direction depicted in FIG. 2, for example, largely varies), the estimation method according to the present example still makes it possible to obtain correct interference noise power estimation. That is, even when the channel variations in the time direction are large, the channel variations in the frequency direction are small. Hence, as far as a difference of the average values between the pilot channel values at different times T(n) and T(n+1) are obtained, the deviation due to channel variations in the time direction is absorbed (canceled), so that it is possible to estimate interference noise power with high accuracy.

That is, according to the estimation method of the present example, as indicated in the following table 1, for example, it is possible to estimate the interference noise power with high accuracy even under any of the propagation circumstances with the exception of the propagation circumstances in which both of the frequency selective fading and the time selective fading are large.

TABLE 1

Accuracy in Each Propagation Circumstances with Estimation Method of Present Example

| Channel Variations | Frequency Direction | |
|---|---|---|
| | Large | Small |
| Time Direction Large | low | high |
| Time Direction Small | high | high |

In contrast to this, according to the previous method (that is, the method in which only the pilot channel value in the frequency direction is used) and the method in which only the pilot channel value in the time direction is used, estimation errors in interference noise power are generated even in a case where the channel variations in the frequency direction are large even with small channel variations in the time direction, and also in a case where the channel variations in the time direction is large even with small channel variations in the frequency direction, as indicated in the following tables 2 and 3.

TABLE 2

Accuracy in Each Propagation Circumstances in Previous Estimation Method (Only Pilot in Frequency Direction)

| Channel Variations | Frequency Direction | |
|---|---|---|
| | Large | Small |
| Time Direction Large | low | high |
| Time Direction Small | low | high |

TABLE 3

Accuracy in Each Propagation Circumstances in Previous Estimation Method (Only Pilot in Time Direction)

| Channel Variations | Frequency Direction | |
|---|---|---|
| | Large | Small |
| Time Direction Large | low | low |
| Time Direction Small | high | high |

Figure 10:
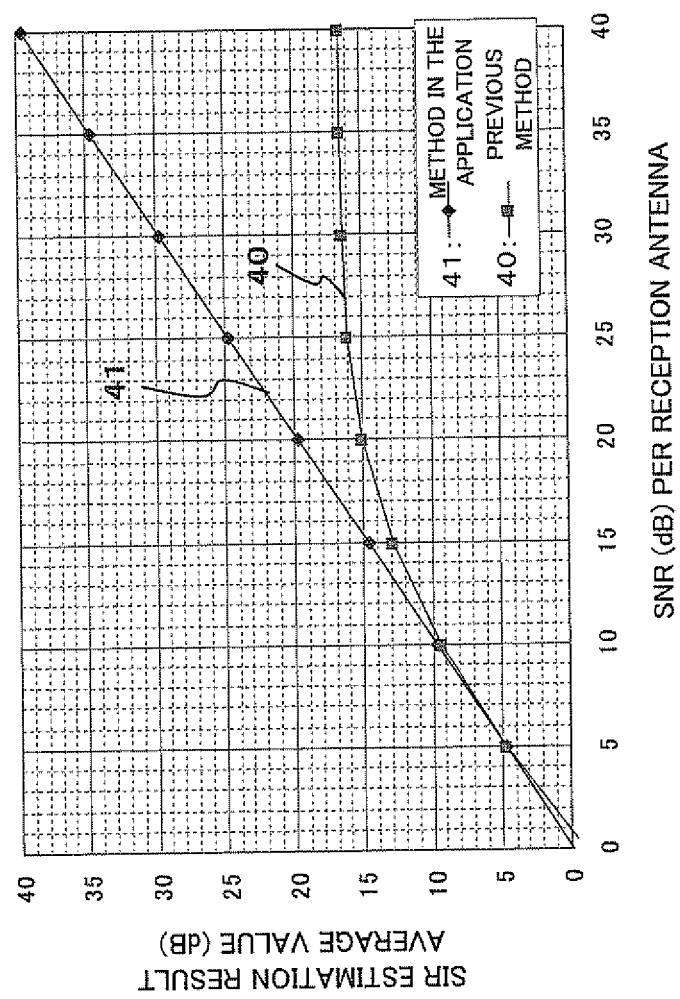
FIG. 10 is a diagram illustrating characteristics of an average value of an SNR-to-SIR estimation value per receiver antenna for describing the effects of the estimation method according to the present embodiment in comparison with the previous method.

FIG. 10 indicates an example of a result of computer simulation performed to the SIR estimation result average value (dB) for SNR (dB) per single receiver antenna obtained with the previous estimation method and the estimation method in the present example in a case where channel variations due to the frequency selective fading and the time selective fading are present. Here, simulation conditions are equivalent to those of "Typical Urban Channel Model" [see ANNEX A.2.1.2 (p 116-p 120)] in the system of the above mentioned non-patent document 1.

In this FIG. 10, the characteristic 40 indicates the simulation result obtained by the previous technique; the characteristic 41 indicates the simulation result obtained by the estimation method according to the present example. With the previous technique, estimation errors become larger in the vicinity where the reception quality exceeds SNR=10 dB. Even in a case of fine reception quality circumstances of SNR=30 dB (that is, practically, interference noise is small or absent), the SIR estimation result average value is not higher than 20 dB, resultantly being saturated. However, with the estimation method in the present example, it is understandable that it is possible to measure the SNR value being remarkably high, so that accurate estimation is available.

As described above, with the estimation method according to the present embodiment, it become possible to estimate interference noise power with high accuracy even under propagation circumstances in which either of the frequency selective fading and the time selective fading is large.

[B] Modified Example

In the above described embodiment, each of the averages of the channel values of the two pilot signals positioned at the both ends of the diagonal lines of a quadrangle formed by the four pilot signal positions adjacent to each other in the time direction and the frequency direction, is obtained on the assumption that transmission is performed with the allocation illustrated in FIG. 2, that is, under the state in which the pilot signals are allocated at M(=6) sub-carrier intervals (cycles) in the sub-frame leading symbol. However, the present invention should by no means be limited to this, and the present invention is applicable in cases of other allocations, and it is possible to realize the effects and benefits similar to the those already described.

For example, even in a case where the sub-carrier intervals at which pilot signals are allocated are different in each symbol time, and also, even in a case where the pilot signals are allocated at predetermined sub-carrier intervals at more than one symbol time periods in the same sub-frame, it becomes possible to estimate the SIR with high accuracy at least in comparison with the previous technique by means of obtaining each average of the channel values of the two pilot signals positioned at the both ends of the diagonal lines of a quadrangle formed by the four pilot signal positions adjacent to each other in the time direction and the frequency direction.

Further, the pilot signal positions which are the subjects of averaging should not necessarily be adjacent pilot signal positions as to the frequency direction and the time direction. However, as to both of the frequency direction and the time direction, the estimation accuracy is improved by use of the pilot channel value at closer pilot signal positions.

Hereinafter, descriptions will be made of several modified examples. In this instance, in the following description of the modified examples, the parts described with addition of codes the same as those already described indicate the parts the same as or similar to those already described unless otherwise described.

(B1) First Modified Example

Figure 11:
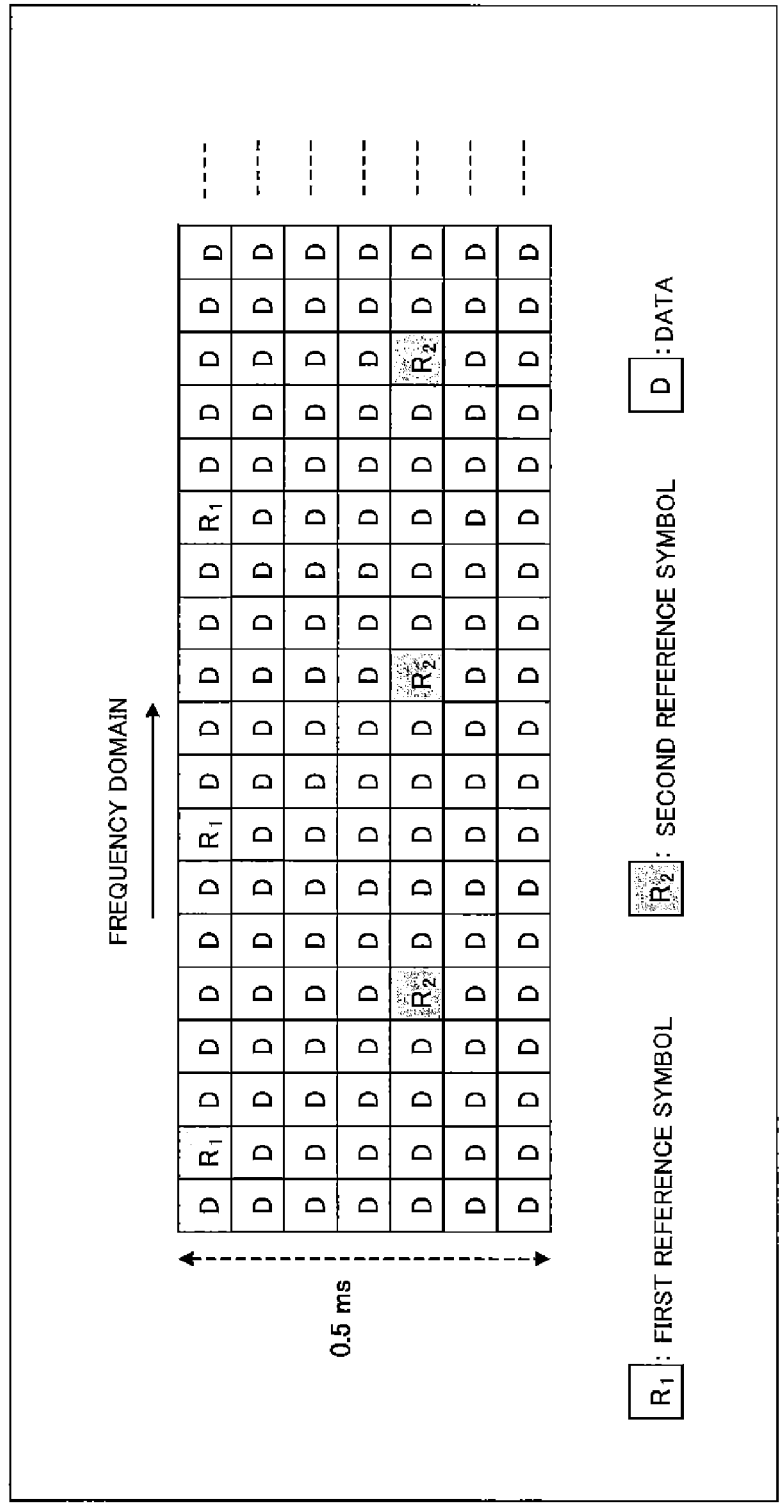
FIG. 11 is a diagram illustrating an example of a downlink transmission frame format in OFDM.

In the above described embodiment, a description is made of a case in which the pilot signals (which are symbols indicated by the diagonally shaded parts in FIG. 2 and correspond to the first pilot signal $R_1$ in FIG. 11). However, in the case of the pilot allocation depicted in FIG. 11, when the first pilot signal $R_1$ and the second pilot signal $R_2$ are allocated to the sub-carrier frequencies different in more than one symbol time period in the same sub-frame, the similar estimation method is applicable also to the second pilot signal $R_2$.

In this case, the estimation method for the first pilot signal $R_1$ is applied also to the second pilot signal $R_2$, and then averages those, thereby making it possible to estimate interference noise power with higher accuracy.

In more detail, in a case where the first pilot signal $R_1$ mapped to the i-th position from band end of the sub-frame #n is expressed as h(1, a, n, Mi) in the antenna #a and the second pilot signal $R_2$ mapped to the i-th position from band end of the sub-frame #n is expressed as h(2, a, n, Mi) in the antenna #a, these pilot symbols $R_1$ and $R_2$ each are extracted by the pilot extraction unit 25 (see FIG. 4), and the signals are made to be those from which pilot symbol patterns are cancelled.

Then, in a case where estimation is performed by averaging executed $K_1$ times to the pilot symbol $R_1$ and estimation is performed by averaging executed $K_2$ times to the pilot symbol $R_2$, the interference noise power (noise estimation values) $\sigma_{est}^2(1,a,n)$, $\sigma_{est}^2(2,a,n)$ each estimated is expressed by the following formulae (7) and (8). In this instance, the number of times $K_1$ and $K_2$ can be the same or different from each other.

$$\sigma_{est}^2(1, a, n) = \frac{1}{K_1 - 1} \sum_{i=0}^{K_1-2} \left| \frac{h(1, a, n, Mi) + h(1, a, n+1, M(i+1))}{2} - \frac{h(1, a, n, M(i+1)) + h(1, a, n+1, Mi)}{2} \right|^2 \quad (7)$$

$$\sigma_{est}^2(2, a, n) = \frac{1}{K_2 - 1} \sum_{i=0}^{K_2-2} \left| \frac{h(2, a, n, Mi) + h(2, a, n+1, M(i+1))}{2} - \frac{h(2, a, n, M(i+1)) + h(2, a, n+1, Mi)}{2} \right|^2 \quad (8)$$

When these formulae (7) and (8) are shown diagrammatically, each of those diagrams becomes the same as that of FIG. 6. $\sigma_{est}^2(1,a,n)$, $\sigma_{est}^2(2,a,n)$, each obtained by the formulae (7) and (8) are subjected to averaging of the following formula (9), which makes it possible to obtain the estimation value $\sigma_{est}^2(a,n)$ with improved accuracy.

$$\sigma_{est}^2(a, n) = \frac{1}{2}(\sigma_{est}^2(1, a, n) + \sigma_{est}^2(2, a, n)) \quad (9)$$

(B2) Second Modified Example

Figure 12:
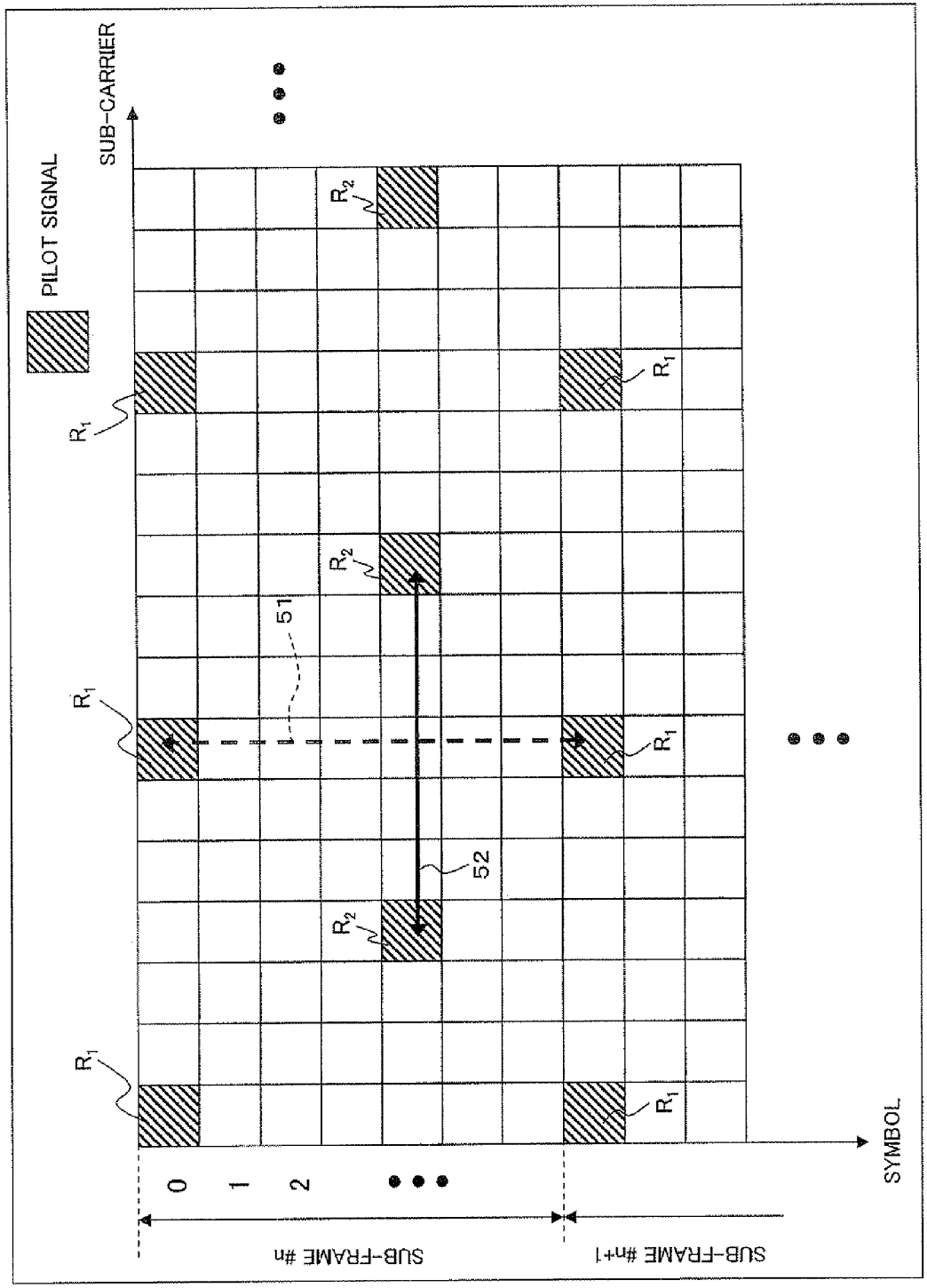
FIG. 12 is a diagram illustrating the example of allocation of pilot signals corresponding to that depicted in FIG. 2 for describing an estimation method according to a second modified example of the present embodiment.

As a second modified example of the estimation method, as illustrated in FIG. 12, for example, a method is considerable in which a difference is used, which difference is between the average value (time direction average value) of the pilot symbols $R_1$ allocated to the same sub-carrier frequency at different sub-frames (different symbol time periods) and the pilot symbol $R_2$ allocated at the both ends of the solid arrow 52, that is, the average value (frequency-direction average value) of the pilot symbols $R_2$ allocated to different sub-carrier frequencies at the same symbol time period in the same sub-frame.

In this case, applying the estimation method described with reference to FIG. 6 by use of the two pilot symbols $R_1$ and the two pilot symbols $R_2$ makes it possible to estimate interference noise power with higher accuracy.

That is, in a case where the first pilot signal $R_1$ mapped to the i-th position from band end of the sub-frame #n is expressed as h(1, a, n, Mi) in the antenna #a and the second pilot signal $R_2$ mapped to the i-th position from band end of the sub-frame #n is expressed as h(2, a, n, Mi) in the antenna #a, these pilot symbols $R_1$ and $R_2$ each are extracted by the pilot extraction unit 25 (see FIG. 4) and the signals are made to be those from which pilot symbol patterns are cancelled.

Then, in a case where estimation is performed by performing averaging $k_1$ times by use of these, the estimated interference noise power (noise estimation value) $\sigma_{est}^2(a,n)$ can be expressed by the following formula (10):

$$\sigma_{est}^2(a, n) = \frac{1}{K_1 - 1} \sum_{i=0}^{K_1-2} \left| \frac{h(1, a, n, M(i+1)) + h(1, a, n+1, M(i+1))}{2} - \frac{h(2, a, n, Mi) + h(2, a, n, M(i+1))}{2} \right|^2 \quad (10)$$

Here, in the previous technology, as already described with reference to FIG. 7(B), since the calculation is performed with a difference between a certain average value and the pilot signal at a specific position (using the pilot signals at the both ends with the pilot signal at a specific position as the center thereof), the calculation is the average value calculation in a wide domain in the frequency direction or the time direction. In contrast to this, the use of the estimation method of the present example, in which calculation is performed with a difference of the average values, makes it possible to perform a closed calculation in a smaller time×frequency domain.

Therefore, in comparison with the previous estimation method in which only the frequency direction or the time direction is used, the present modified example is capable of performing the estimation by use of only information more localized in the two-dimensional domain of the time and the frequency domain, so that it becomes possible to reduce deterioration due to effects from channel variations in a case where the variations in at least either of the time direction and the frequency direction is large.

In this instance, as to a third modified example described below, the effects and benefits similar to the above can also be realized because the third modified example is also based on the technological principles similar to those of the estimation methods already described.

(B3) Third Modified Example

Figure 13:
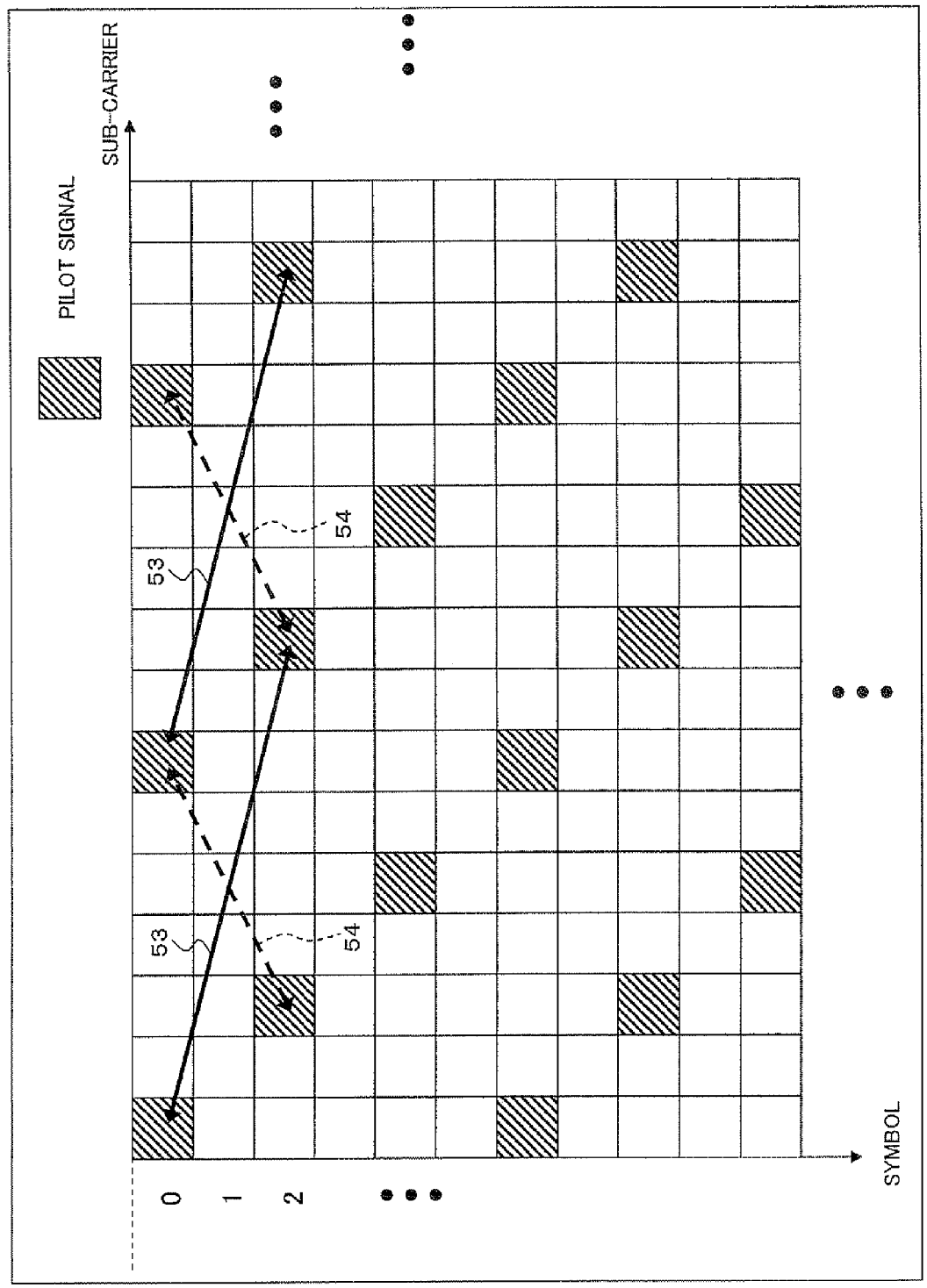
FIG. 13 is a diagram illustrating the example of allocation of pilot signals corresponding to that depicted in FIG. 2 for describing an estimation method according to a third modified example of the present embodiment.

Further, as illustrated in FIG. 13, for example, another pilot symbol allocation is considerable in which pilot symbols are allocated with deviation thereof in the frequency direction with respect to different time periods in a certain frame time period. As such an example, the DVB (Digital Video Broadcasting)-T standard regulation is present, which is one of the standard regulations for the terrestrial television broadcasting, and as reference document 1, there is "ETSI. Digital broadcasting systems for television, sound and data services: ETS 300744.1997". In addition, as reference document 2, a pilot signal allocation is exemplified in FIG. 1 of "M. Speth, S. Fechtel, G. Fock, H. Meyr, "Broadband Communications, 1998. Accessing, Transmission, Networking. Proceedings. 1998 International Zurich Seminar on 17-19 Feb. 1998 Page(s): 99-104".

In a case of such a pilot symbol allocation, it is better, for realizing estimation with higher accuracy, to calculate the average value of the pilot symbols allocated closer in time, that is, the average value between the pilot symbols positioned at the both ends of the solid arrow 53 and the average value of the pilot symbols positioned at the both ends of the dotted arrow 54, and to then estimate the difference between them, thereby estimating interference noise power. This realizes estimation with higher accuracy.

For example, as illustrated in FIG. 13, in a case where the pilot symbols are allocated with deviation by the unit of two sub-carriers in the frequency direction per two symbol time periods, and the pilot symbol mapped to the i-th position from the end of the band of the symbol number=#t (t is an integer not smaller than "0") of the sub-frame #n is expressed as h (a, n, Mi, t) in the antenna #a. In the estimation method used in this case, the pilot symbol is extracted by the pilot extraction unit 25 (see FIG. 4) and is made to be a signal from which the pilot pattern is canceled. In a case where the estimation is performed by means of averaging performed K-times and averaging for (L+1) rows in the time direction, interference noise power (noise estimation value) h(a, n) is expressed by the following formula (11).

$$\sigma_{est}^2(a, n) = \frac{1}{L}\sum_{t=0}^{L-1}\frac{1}{K-1}\sum_{i=0}^{K-2}\left|\frac{h(a, Mi, 2t) + h(a, M(i+1), 2t+2)}{2} - \frac{h(a, M(i+1), 2t) + h(a, Mi, 2t+2)}{2}\right|^2 \quad (11)$$

Figure 14:
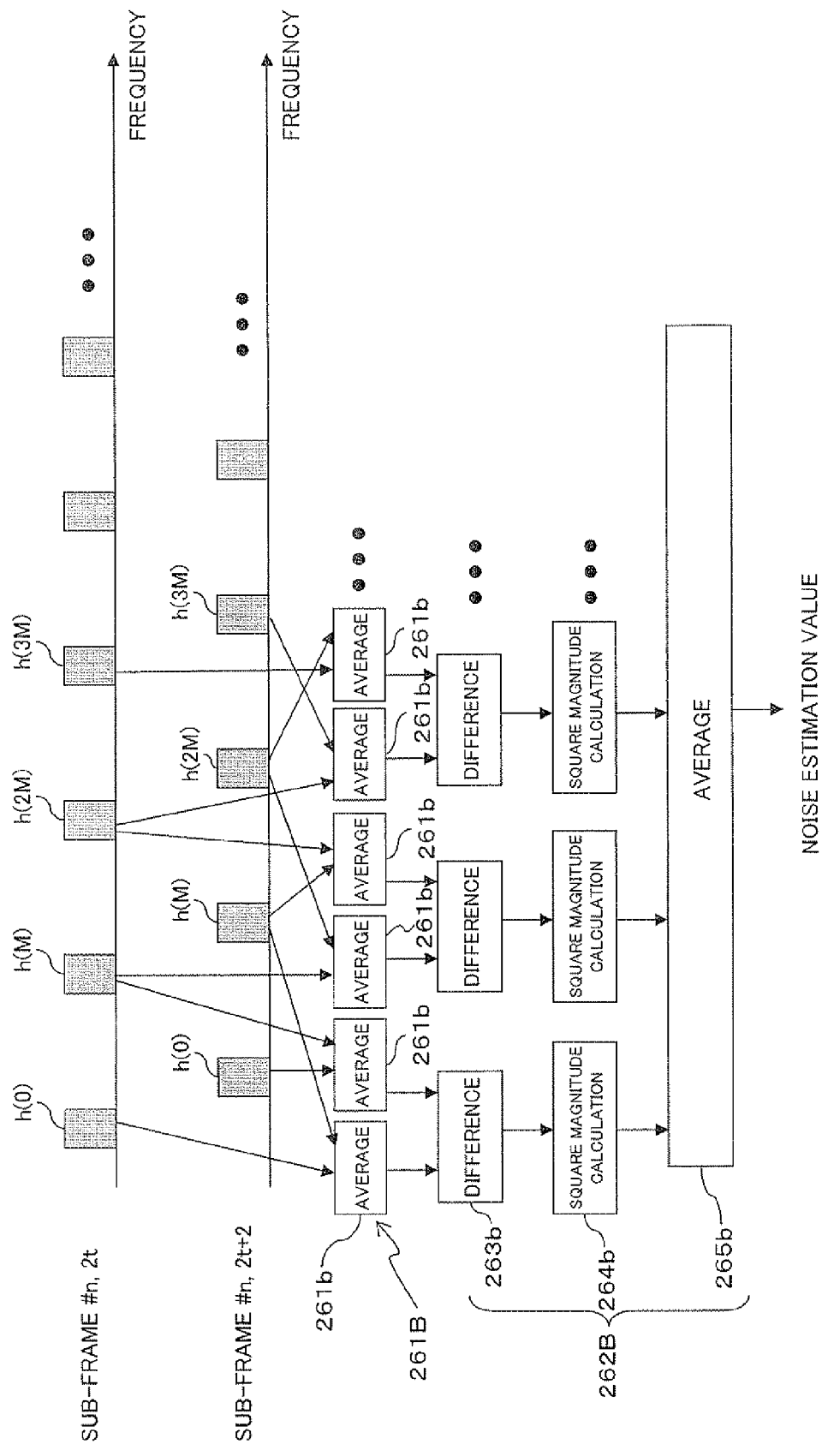
FIG. 14 is a conceptual diagram illustrating the procedures of estimation (calculation) corresponding to those depicted in FIG. 6 for describing an estimation method according to the third modified example of the present embodiment.

FIG. 14 is given as a result of diagrammatic representation according to the procedures similar to those in FIG. 6. That is, in the estimation method in the present example, as to the same reception antenna #a, (1) in a certain sub-frame #n, the average value is obtained between a pilot signal h(a, n, Mi, 2t) allocated to the sub-carrier #Mi at a certain symbol time 2t and the pilot signal h(a, n, M(i+1), 2t+2) allocated adjacent to the frequency (high-frequency side) different with respect to the pilot signal h(a, n, Mi, 2t) by the unit of two sub-carriers at symbol time (2t+2) [see pilot averaging procedure: see reference character 261B (261b)];

(2) in the same sub-frame #n, the average value is obtained between a pilot signal h(a, n, Mi, 2t) allocated to the frequency different in the frequency direction with respect to the pilot signal h(a, n, Mi, 2t) by the unit of two sub-carriers and the pilot signal h(a, n, M(i+1), 2t) allocated to the frequency (low-frequency side) different with respect to the pilot signal h(a, n, M(i+1), 2t) by the unit of two sub-carriers at the time period (2t+2) by two symbol time periods (pilot averaging procedure: see reference character 261B (261b);

(3) a difference between these average values is detected by the difference detection means (procedure) 263b and electrified by the square magnitude calculation means (procedure) 264b for a predetermined number of pilot signals, and the power average value there among is obtained by the averaging means (procedure) 265(b) as the estimation value of interference noise power (interference noise power estimation procedure: see reference character 262B).

(B4) Fourth Modified Example

Figure 15:
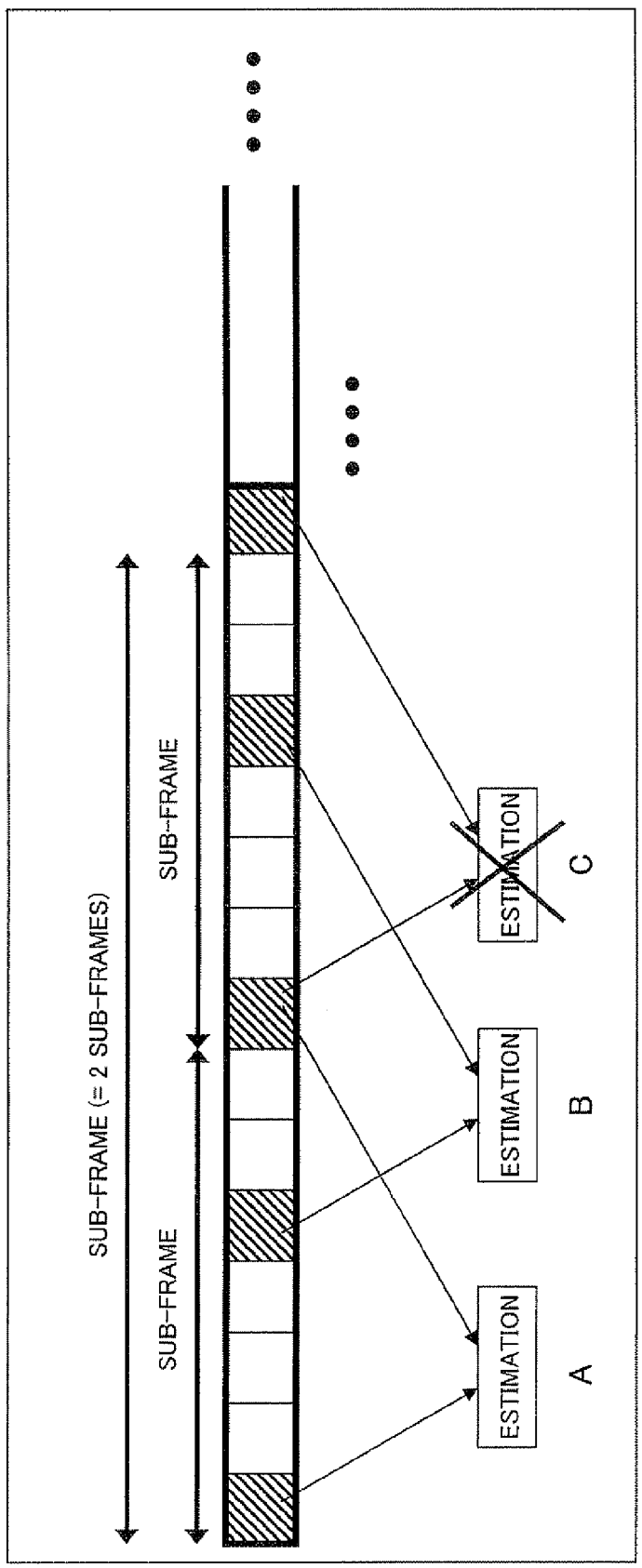
FIG. 15 is a diagram illustrating an example of a frame format for describing an estimation method according to a fourth modified example of the present embodiment.

In a case where more than one sub-frame is organized into a larger frame, as illustrated in FIG. 15, for example, it can occur that pilot symbols are not always mapped to all the frames and that the characteristics such as the directivity or the like of pilot symbols are different in different frames.

That is, in a packet system in which allocation of user data or the like is performed by the unit of a frame, it can occur that pilot signals are sent only by the frames to which data is allocated and that no pilot signal is mapped to the next frame or the previous frame (adjacent frames). Further, in systems in which directive beams and two or more transmission methods are switched in use, it can occur that the directivities or the like of pilot signals are different in different frames, so that the interference power to be estimated itself differs in different frames.

In such a case, any of the above described estimation methods is applied to the pilot signals (see the diagonally shaded parts) in a frame as indicated by the reference characters A and B in FIG. 15, and it is preferable that an estimation using the pairs of pilot signals spreading across the frames (not sub-frames) indicated by the reference character C is not performed. Further, it is preferable that the averaging of the estimation values performed multiple times, which is described in the first modified example, is executed only to the estimation results (A and B) in the same frame, and that such an estimation is not performed to the estimation result (C) between different frames. This makes it possible to more correctly estimate interference noise power in the frame which is a subject of the estimation.

Here, recognition of the frames which are subjects of estimation is capable of being executed based on the control information in a case where, for example, information indicating the presence or the absence of data allocation in frames, the recognition information of directive beams (allocation information of orthogonal codes or the like), and mapping information of the pilot symbols corresponding to the transmission methods, are mapped in each frame or every several frames.

Figure 16:
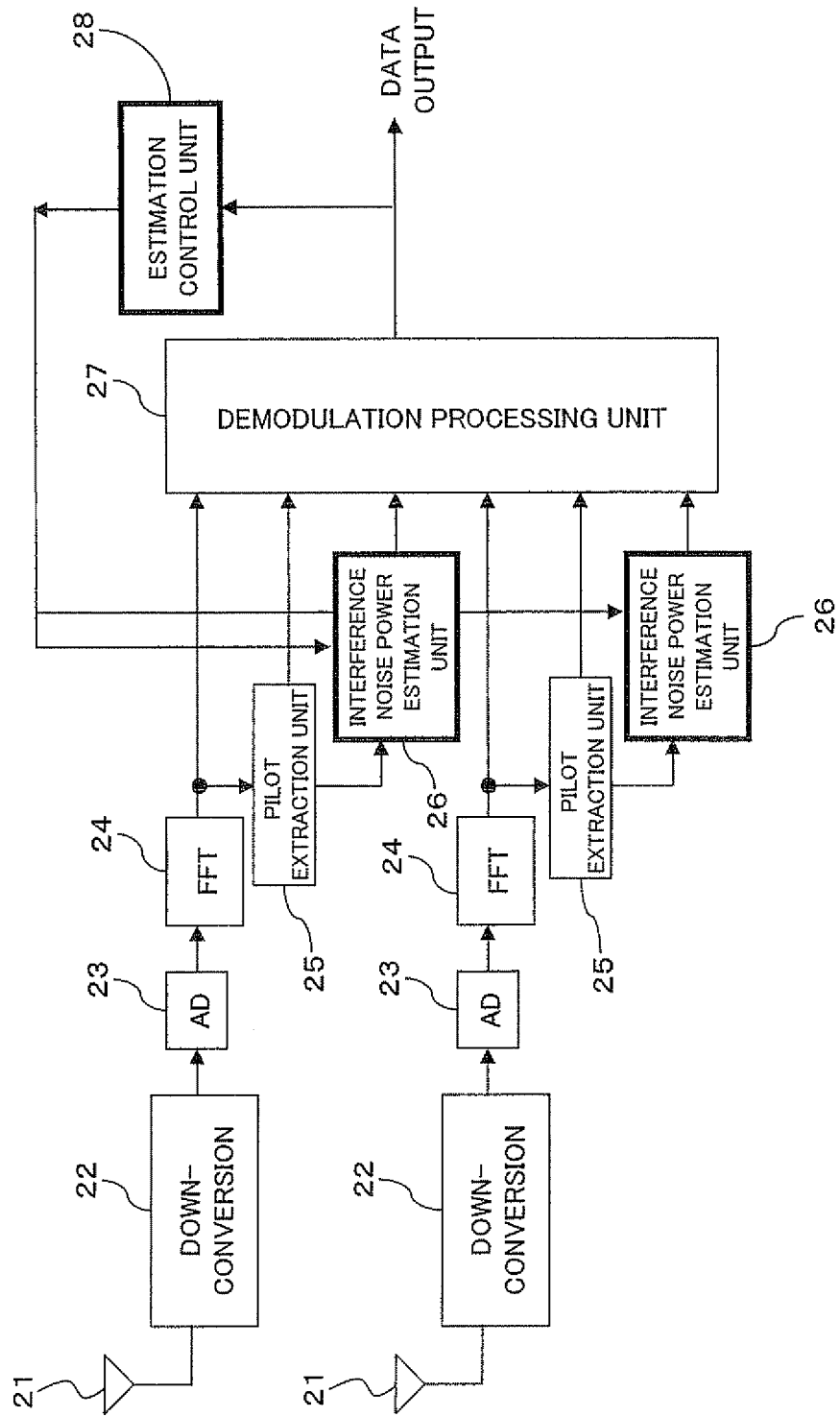
FIG. 16 is a block diagram illustrating an example of the configuration of the part of an OFDM receiver according to the fourth modified example of the present embodiment.

Therefore, as illustrated in FIG. 16, for example, the OFDM receiver depicted in FIG. 4 is added thereto with an estimation control unit 28. The estimation control unit 28 obtains the above mentioned control information from the demodulation result in the reception frames obtained by the demodulation processing unit 27, and determines estimation subject frames based on the control information. The interference noise power estimation unit 26 is controlled in such a manner that it makes the estimation result obtained by the interference noise power estimation unit 26 effective only for the frames which are determined as the estimation subject frames, and makes the estimation result ineffective for the other frames. This makes it possible to realize switching between the effectiveness and the ineffectiveness of the estimation result corresponding to the reception frames, and to improve the estimation accuracy of the interference noise power.

That is, the estimation control unit 28 of the present example has both of the functions, as an evaluation means for evaluating whether or not the above described pilot averaging procedure and interference noise estimation procedure are to be executed, and as a control means for executing the above described pilot averaging procedure and interference noise estimation procedure by use of only the pilot signals in the reception frames in which the pilot averaging procedure and interference noise estimation procedure are determined to be executed by this evaluation means.

In this instance, the above described modified examples can be executed in appropriate combinations thereof in an appropriately superposed manner or a selective manner.

According to the present invention, at least the following effects and benefits are obtained.

That is, even when channel variations in the frequency direction or the time direction are large, the variations of the average value due to the channel variations are absorbed by obtaining an average between the pilot signals received at different times and at different frequencies. As a result, it is possible to suppress the effects given by channel variations in the frequency direction or the time direction to estimation calculation of interference noise, so that the reception ability (demodulation ability) is resultantly improved.

All examples and conditional language recited herein are intended for pedagogical purposes to aid the reader in understanding the principles of the invention and the concepts contributed by the inventor to furthering the art, and are to be constructed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

INDUSTRIAL APPLICABILITY

As detailed above, the present invention makes it possible to estimate interference noise estimation with high accuracy even in a case where channel variations in the frequency direction or the time direction are large. Accordingly, the invention is considered to be greatly useful in the field of radio communications technology.

What is claimed is:

1. An interference noise estimation method for estimating interference noise for use in a multicarrier communications system in which pilot signals allocated at different subcarrier frequencies in a predetermined transmission frequency band are transmitted, the method comprising:
   obtaining average values between the pilot signals received at different-symbol timing periods and at two or more of the different subcarrier frequencies; and
   estimating the interference noise based on a difference of the average values obtained,
   wherein, when obtaining the average values, calculating the obtained average values of the pilot signals allocated at both ends of two diagonal lines of a quadrangle formed by four positions at which four pilot signals are allocated, respectively, in a two-dimensional domain of a time domain and a frequency domain.

2. The interference noise estimation method as set forth in claim 1, wherein the four pilot signals include two adjacent pilot signals in a time direction in the two-dimensional domain and two adjacent pilot signals in a frequency direction in the two-dimensional domain.

3. The interference noise estimation method as set forth in claim 1, wherein the quadrangle formed by allocation positions of the four pilot signals is a parallelogram.

4. The interference noise estimation method as set forth in claim 1, the method further comprising:
   calculating the obtained average values of first pilot signals of a number of four and the obtained average values of second pilot signals of a number of four;
   estimating a first interference noise as the estimated interference noise based on the difference of the obtained average values of the first pilot signals calculated and a second interference noise as the estimated interference noise based on the difference of the obtained average values of the second pilot signals calculated; and
   averaging the estimated first interference noise and the estimated second interference noise.

5. A reception processing method for use in a multicarrier communications system in which pilot signals allocated at different subcarrier frequencies in a predetermined transmission frequency band are transmitted, the method comprising:
   obtaining average values between the pilot signals received at different symbol timing periods and at two or more of the different subcarrier frequencies;
   estimating interference noise based on a difference of the average values obtained; and
   performing multicarrier demodulation processing, which demodulates frames received through the multicarrier communications system, based on the estimated interference noise,
   wherein, when obtaining the average values, calculating the obtained average values of the pilot signals allocated at both ends of two diagonal lines of a quadrangle formed by four positions at which four pilot signals are allocated, respectively, in a two-dimensional domain of a time domain and a frequency domain.

6. An interference noise estimation apparatus for use in a multicarrier communications system in which pilot signals allocated at different subcarrier frequencies in a predetermined transmission frequency band are transmitted, the apparatus comprising:
   a plurality of pilot averaging circuits that obtain average values between the pilot signals received at different symbol timing periods and at two or more of the different subcarrier frequencies;
   a plurality of difference detection circuits, each of which detects a difference of the average values obtained;
   a plurality of square magnitude calculation circuits, each of which calculates a power corresponding to the difference detected; and
   an average circuit that obtains an average value of the powers calculated by the plurality of square magnitude calculation circuits as an estimation value of interference noise power,
   wherein the plurality of pilot averaging circuits calculate, when obtaining the average values, the obtained average values of the pilot signals allocated at both ends of two diagonal lines of a quadrangle formed by four positions at which four pilot signals are allocated, respectively, in a two-dimensional domain of a time domain and a frequency domain.

7. The interference noise estimation apparatus as set forth in claim 6, wherein the four pilot signals include two adjacent pilot signals in a time direction in the two-dimensional domain and two adjacent pilot signals in a frequency direction in the two-dimensional domain.

8. The interference noise estimation apparatus as set forth in claim 6, wherein the quadrangle formed by allocation positions of the four pilot signals is a parallelogram.

9. A receiver for use in a multicarrier communications system in which pilot signals allocated at different subcarrier frequencies in a predetermined transmission frequency band are transmitted, the receiver comprising:
   an interference noise estimation apparatus comprising:
      a plurality of pilot averaging circuits that obtain average values between the pilot signals received at different symbol timing periods and at two or more of the different subcarrier frequencies;
      a plurality of difference detection circuits, each of which detects a difference of the average values obtained;
      a plurality of square magnitude calculation circuits, each of which calculates a power corresponding to the difference detected; and
      an average circuit that obtains an average value of the powers calculated by the plurality of square magnitude calculation circuits as an estimation value of interference noise power,
   wherein the receiver performs multicarrier demodulation processing, which demodulates frames received through the multicarrier communications system, based on the estimation value obtained by the average circuit; and
   the plurality of pilot averaging circuits calculate, when obtaining the average values, the obtained average values of the pilot signals allocated at both ends of two diagonal lines of a quadrangle formed by four positions at which four pilot signals are allocated, respectively, in a two-dimensional domain of a time domain and a frequency domain.

10. An interference noise estimation method for use in a multicarrier communications system in which pilot signals allocated at different subcarrier frequencies in a predetermined transmission frequency band are transmitted, the method comprising:
   obtaining a first average value between the pilot signals received at different symbol timing periods and at one of the different subcarrier frequencies;
   obtaining a second average value between the pilot signals received at a same symbol timing period and at two or more of the different subcarrier frequencies; and
   estimating interference noise based on a difference of the first average value obtained and the second average value obtained,
   wherein, when obtaining the first average value and the second average value, calculating the obtained first average value and the obtained second average value of the pilot signals allocated at both ends of two diagonal lines of a quadrangle formed by four positions at which four pilot signals are allocated, respectively, in a two-dimensional domain of a time domain and a frequency domain.

11. An interference noise estimation method for estimating interference noise for use in a multicarrier communications system in which pilot signals allocated at different subcarrier frequencies in a predetermined transmission frequency band are transmitted, the method comprising:
   obtaining average values between the pilot signals received at different-symbol timing periods and at two or more of the different subcarrier frequencies;
   estimating the interference noise based on a difference of the average values obtained;
   evaluating whether or not obtaining the average values and estimating the interference noise are to be performed separately to each of reception frames received through the multicarrier communications system; and
   obtaining the average values and estimating the interference noise by using the pilot signals in a reception frame of the reception frames to which obtaining the average values and estimating the interference noise are determined to be performed.

12. A reception processing method for use in a multicarrier communications system in which pilot signals allocated at different subcarrier frequencies in a predetermined transmission frequency band are transmitted, the method comprising:
   obtaining a first average value between the pilot signals received at different symbol timing periods and at one of the different subcarrier frequencies;
   obtaining a second average value between the pilot signals received at a same symbol timing period and at two or more of the different subcarrier frequencies;
   estimating interference noise based on a difference of the first average value obtained and the second average value obtained; and
   performing multicarrier demodulation processing based on the estimated interference noise,
   wherein, when obtaining the first average value and the second average value, calculating the obtained first average value and the obtained second average value of the pilot signals allocated at both ends of two diagonal lines of a quadrangle formed by four positions at which four pilot signals are allocated, respectively, in a two-dimensional domain of a time domain and a frequency domain.

13. An interference noise estimation apparatus for use in a multicarrier communications system in which pilot signals allocated at different subcarrier frequencies in a predetermined transmission frequency band are transmitted, the apparatus comprising:
   a first pilot average circuit that obtains a first average value between the pilot signals received at different symbol timing periods and at one of the different subcarrier frequencies;
   a second pilot average circuit that obtains a second average value of the pilot signals received at a same symbol timing period and at two or more of the different subcarrier frequencies;
   a plurality of difference detection circuits, each of which detects a difference of the first average value obtained and the second average value obtained;
   a plurality of square magnitude calculation circuits, each of which calculates a power corresponding to the difference detected; and
   an average circuit that obtains an average value of the powers calculated by the plurality of square magnitude calculation circuits as an estimation value of interference noise power,
   wherein the first pilot average circuit and the second average circuit calculate, when obtaining the first average value and the second average value, the obtained first average value and the obtained second average value of the pilot signals allocated at both ends of two diagonal lines of a quadrangle formed by four positions at which four pilot signals are allocated, respectively, in a two-dimensional domain of a time domain and a frequency domain.

14. A receiver for use in a multicarrier communications system in which pilot signals allocated at different subcarrier frequencies in a predetermined transmission frequency band are transmitted, the receiver comprising:
an interference noise estimation apparatus comprising:
a plurality of pilot averaging circuits that obtain average values between the pilot signals received at different symbol timing periods and at two or more of the different subcarrier frequencies;
a plurality of difference detection circuits, each of which detects a difference of the average values obtained;
a plurality of square magnitude calculation circuits, each of which calculates a power corresponding to the difference detected; and
an average circuit that obtains and estimates an average value of the powers calculated by the plurality of square magnitude calculation circuits as an estimation value of interference noise power; and
a control circuit that evaluates whether or not the average circuit when executing the obtaining and the estimating are to be executed separately to each of reception frames received through the multicarrier communications system, and executes the obtaining and the estimating by using the pilot signals in a reception frame of the reception frames to which the obtaining and the estimating are determined to be executed.

15. A receiver for use in a multicarrier communications system in which pilot signals allocated at different subcarrier frequencies in a predetermined transmission frequency band are transmitted, the receiver comprising:
an interference noise estimation apparatus comprising:
a first pilot average circuit that obtains a first average value between the pilot signals received at different symbol timing periods and at one of the different subcarrier frequencies;
a second pilot average circuit that obtains a second average value between the pilot signals received at a same symbol timing period and at two or more of the different subcarrier frequencies;
a plurality of difference detection circuits, each of which detects a difference of the first average value obtained and the second average value obtained;
a plurality of square magnitude calculation circuits, each of which calculates a power corresponding to the difference detected; and
an average circuit that obtains an average value of the powers calculated by the plurality of square magnitude calculation circuits as an estimation value of interference noise power,
wherein the receiver performs multicarrier demodulation processing, which demodulates frames received through the multicarrier communications system, based on the estimation value obtained by the average circuit; and
the first pilot average circuit and the second average circuit calculate, when obtaining the first average value and the second average value, the obtained first average value and the obtained second average value of the pilot signals allocated at both ends of two diagonal lines of a quadrangle formed by four positions at which four pilot signals are allocated, respectively, in a two-dimensional domain of a time domain and a frequency domain.

* * * * *